(12) United States Patent
Hyatt

(10) Patent No.: US 8,755,667 B2
(45) Date of Patent: *Jun. 17, 2014

(54) DATA ENTRY VIA ON-SCREEN DISPLAY

(75) Inventor: Richard R. Hyatt, Indianapolis, IN (US)

(73) Assignee: Digital Networks North America, Inc., Cupertino, CA (US)

( * ) Notice: Subject to any disclaimer, the term of this patent is extended or adjusted under 35 U.S.C. 154(b) by 1766 days.

This patent is subject to a terminal disclaimer.

(21) Appl. No.: 12/140,213

(22) Filed: Jun. 16, 2008

(65) Prior Publication Data

US 2008/0247733 A1    Oct. 9, 2008

Related U.S. Application Data

(63) Continuation of application No. 10/012,438, filed on Dec. 12, 2001, now Pat. No. 7,389,034.

(60) Provisional application No. 60/256,335, filed on Dec. 19, 2000.

(51) Int. Cl.
*H04N 5/775* (2006.01)
*H04N 9/80* (2006.01)

(52) U.S. Cl.
USPC .......................................... 386/230; 386/248

(58) Field of Classification Search
USPC .................. 386/230, 241, 248, 332–336, 341
See application file for complete search history.

(56) References Cited

U.S. PATENT DOCUMENTS

| 4,667,802 | A | 5/1987 | Verduin et al. |
|---|---|---|---|
| 5,081,449 | A | 1/1992 | Kurosu et al. |
| 5,146,552 | A | 9/1992 | Cassorla et al. |
| 5,307,172 | A | 4/1994 | Oh |
| 5,424,785 | A | 6/1995 | Orphan |
| 5,483,278 | A | 1/1996 | Strubbe et al. |
| 5,485,197 | A | 1/1996 | Hoarty |
| 5,614,940 | A | 3/1997 | Cobbley et al. |
| 5,678,012 | A | 10/1997 | Kimmich et al. |
| 5,717,468 | A | 2/1998 | Baryla |
| 5,740,388 | A | 4/1998 | Hunt |

(Continued)

FOREIGN PATENT DOCUMENTS

| CA | 2365010 | 6/2009 |
|---|---|---|
| DE | 296 04 311 | 12/1996 |

(Continued)

OTHER PUBLICATIONS

Patent Abstracts of Japan 08180658, Jul. 12, 1996 for JP 6-325166.

(Continued)

*Primary Examiner* — Thai Tran
*Assistant Examiner* — Nigar Chowdhury
(74) *Attorney, Agent, or Firm* — McDonnell Boehnen Hulbert & Berghoff LLP

(57) ABSTRACT

A recording playback device having a database of recordings with titles, automatically enters a title input mode upon receiving character input from a user while a recording is being played if the there is not title in the database for the recording. Playback of the recording is not interrupted in the title input mode. In the case of a DVD player, the on-screen display mode is used to display the characters entered by the user on the same video display used for video content from the DVD.

11 Claims, 2 Drawing Sheets

(56) References Cited

U.S. PATENT DOCUMENTS

| | | | |
|---|---|---|---|
| 5,819,286 | A | 10/1998 | Yang et al. |
| 5,877,445 | A | 3/1999 | Hufford et al. |
| 5,911,139 | A | 6/1999 | Jain et al. |
| 5,913,205 | A | 6/1999 | Jain et al. |
| 5,959,945 | A | 9/1999 | Kleiman |
| 5,973,680 | A | 10/1999 | Ueda |
| 5,986,979 | A | 11/1999 | Bickford et al. |
| 6,002,833 | A | 12/1999 | Abecassis |
| 6,005,565 | A | 12/1999 | Legall et al. |
| 6,029,176 | A | 2/2000 | Cannon |
| 6,079,566 | A | 6/2000 | Eleftheriadis et al. |
| 6,092,080 | A | 7/2000 | Gustman |
| 6,118,450 | A | 9/2000 | Proehl et al. |
| 6,131,129 | A | 10/2000 | Ludtke et al. |
| 6,377,518 | B1 | 4/2002 | Auwens et al. |
| 6,519,771 | B1 | 2/2003 | Zenith |
| 6,587,123 | B2 * | 7/2003 | Ando et al. .................. 715/723 |
| 6,859,608 | B1 | 2/2005 | Nishikawa et al. |
| 7,389,034 | B2 | 6/2008 | Hyatt |

FOREIGN PATENT DOCUMENTS

| | | |
|---|---|---|
| DE | 196 08 957 | 9/1997 |
| DE | 198 26 680 | 12/1999 |
| EP | 453 064 | 10/1991 |
| EP | 499 893 | 8/1992 |
| EP | 1223581 | 7/2002 |
| JP | 02-310722 | 12/1990 |
| JP | 03-296983 | 12/1991 |
| JP | 10-290422 | 10/1998 |
| WO | 97/05616 | 2/1997 |
| WO | 98/25269 | 6/1998 |
| WO | 00/70613 | 11/2000 |

OTHER PUBLICATIONS

Patent Abstracts of Japan 2000268543, Sep. 29, 2000 for JP 11-067184.
PowerPlay The Ultimate DVD Source.
Cedia, "Electronic Lifestyles Awards for Manufacturers Excellence," Entry for Best Video Product, PowerPlay, pp. 1-4, Sep. 1999.
PowerPlay The Ultimate DVD Movie Home Server wins Top Manufacturer's Award, Sep. 25, 1999.

* cited by examiner

DATA ENTRY VIA ON-SCREEN DISPLAY

REFERENCE TO COMPUTER PROGRAM LISTING, COMPACT DISC APPENDIX

A compact disc is included herewith and incorporated by reference herein having thereon a computer program listing appendix in the ASCII uncompressed text format with ASCII carriage return, ASCII line feed and all control codes defined in ASCII, having computer compatibility with IBM PC/XT/AT or compatibles, having operating system compatibility with MS-Windows and including file PROGRA~1.TXT (ProgramListing.txt in Windows) of 5,792 bytes, created on Nov. 28, 2001.

BACKGROUND OF THE INVENTION

1. Field of the Invention

The present invention relates to entering text using consumer electronics equipment, and, more particularly, to entering information related to recordings accessible for playing by the consumer electronics equipment.

2. Description of the Related Art

The use of disc changers to play compact discs (CDs) and digital versatile discs (DVDs) has increased significantly in recent years, but it remains difficult for users to identify a disc or obtain information about discs in a changer. Many disc changers available today, particularly those holding 50 or more discs, maintain a database of the discs stored in the changer. However, the input device used to enter textual information, such as titles of the discs, may be on the faceplate of the disc changer or on a handheld remote. Some equipment does have separate alphanumeric keyboards for data input, but the input mode is completely separate from playing the discs. This is similar to alphanumeric input in video games, such as when saving a game. All action stops while the text input occurs.

An example of a system that pauses playback of video data to permit data entry is disclosed in U.S. Pat. No. 5,716,468 to Baryla which is directed to digital video displayed on a personal computer, rather than prerecorded video on discs. The text entered while the video is paused is used to provide comments by reviewers prior to distribution of the video, to aid in scene selection and editing. No description is provided in the '468 patent of how the title is initially associated with the video; the first mention of entering a title is in reference to selecting the video to be played back.

One of the problems with entering textual data related to DVDs and CDs is associating the textual data with a disc. The way this is usually done is to first input a slot identifier identifying a position in the changer, and then input the text associated with the slot. This requires that the user know what disc is in each slot for which textual data is being entered. Many times a user will have no idea what is in each slot of the changer at this point. This requires that the disc be removed from the changer to determine what the disc is. This can often cause issues with the changer identification because the changer keys on whether the user has removed or inserted discs. The simple action of taking the disc out to identify it often kicks off a chain reaction where the changer tries to do something with the disc once it is reinserted. The user must also be careful in most cases to place the disc back into the exact same slot in the changer. Failure to do so can result in incorrect information being displayed for the disc because it is now in a different slot than expected by the user.

SUMMARY OF THE INVENTION

An aspect of the present invention is to simplify the process of inputting textual data related to recordings, such as DVDs and CDs.

Another aspect of the present invention is to provide text input for entering titles of DVDs and CDs during playback of a recording stored thereon.

Yet another aspect of the present invention is to use existing on-screen display (OSD) capabilities of DVD players for display of textual data entered by a user for use as a title of the DVD.

The above aspect can be obtained by a method of inputting text associated with a recording, including detecting activation of a data input device during playback of the recording and automatically entering a data input mode in response to activation of the data input device, while continuing playback of the recording. When the recording generates a video display, preferably the text entered by the user is displayed on the same screen as the video, e.g., using an on-screen display capability of the playback device.

Preferably, as the data input mode is automatically entered, the first character entered is captured in addition to initiating data entry for subsequent characters of a title for the recording, but only if a title for the recording is not already stored in a database. This avoids generation of the on-screen display caused by an accidental activation of a input device, such as a wireless keyboard. Preferably, a key combination, such as Ctrl-Alt-Shift-M, is used to enter a "MasterEdit" mode in which the title and any other information related to the disc that is stored may be edited. This technique may be used to identify discs in a DVD changer using a database containing at least DVD identifiers and titles, permitting users to select discs in the changer by title.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention may be implemented on any type of playback device that includes a way to provide title information to a user. Conventionally, information about a recording is presented to a user on some type of display, although some devices may use speech synthesis or recorded voice to provide audio output of the title. In the exemplary embodiment described below, the invention is used in conjunction with a DVD changer and the video screen that displays the video portion of a recording on a DVD is used to display the textual information entered by a user. However, conventional DVD playback devices are able to playback recordings in other formats, such as compact discs, video compact discs, etc. Regardless of whether there is video content on the recording, the on-screen display typically provided in DVD playback devices can be used during playback of a recording. Playback devices which do not have this inherent capability can be modified or connected to another device to provide a display for input of textual data.

Figure 1:
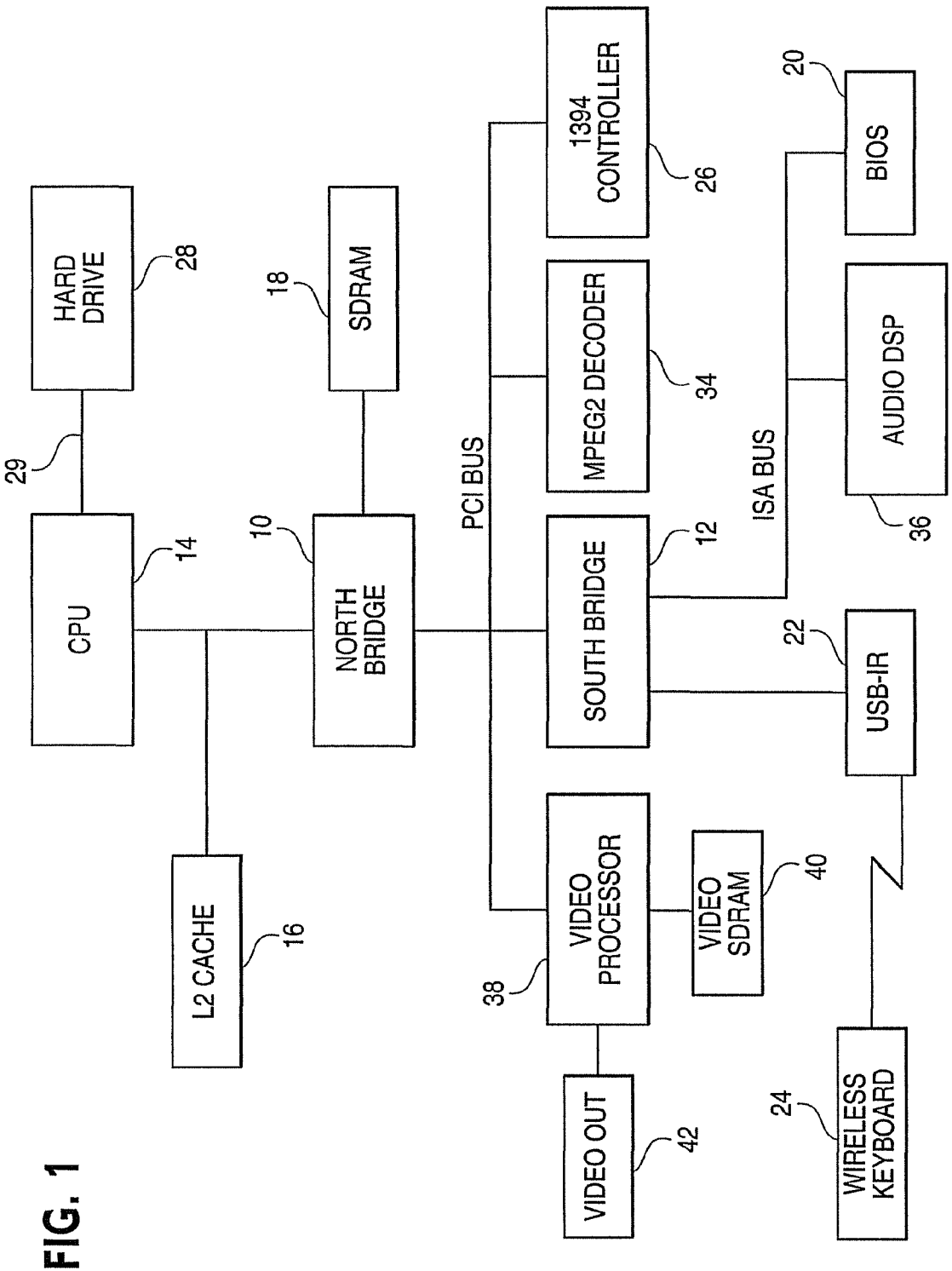
FIG. 1 is a block diagram of an apparatus in which the present invention can be implemented.

In the preferred embodiment, a controller for a DVD changer includes the components illustrated in FIG. 1. In this example, the controller uses a personal computer architecture that includes conventional Northbridge 10 and Southbridge 12 structures (VT82C598MVP and VT82C686A, respectively, from VIA Technologies, Inc. of Taipei, Taiwan), a processor (CPU 14), such as a K6 2/400AFK from Advanced Micro Devices Inc. of Sunnyvale, Calif., cache memory 16, main memory (SDRAM) 18, BIOS ROM 20 and input/output interfaces, such as USB-IR 22 which in this case provides interface for remote input via a wireless (infrared) keyboard 24. Other components illustrated in FIG. 1 that are commonly found in personal computers include 1394 controller 26 for interfacing with external devices, such as other DVD changer(s) using the IEEE-1394 standard also known as FIREWIRE and hard drive 28 which may be an Integrated Drive Electronics Interface (IDE) hard drive connected to CPU 14 via IDE bus 29. Components required for playback of DVDs that are also connected to the Northbridge structure 10 and Southbridge structure 12 via PCI bus 30 or ISA bus 32, include MPEG2 decoder 34, such as an EM8220 from Sigma Designs of Milpitas, Calif., and audio DSP 36, such as a Crystal CS492604-CL from Cirrus Logic of Austin, Tex. The video output signal is generated by video processor 38, such as a CyberPro 5005 from TVIA, Inc. of Santa Clara, Calif. using video memory (e.g., SDRAM) 40 to produce an output at video output 42.

As noted above, conventional video playback devices often include an on-screen text display used for indicating selected channel or video input, rewind, play, fast forward, etc. The present invention utilizes this conventional capability of video processors like the CyberPro 5005 to display text over video signals that continue to be displayed. If desired, the size of the text that is conventionally displayed may be reduced slightly to enable an entire title to appear on the screen. Processor 14 serves as a control unit to specify the text to be displayed by video processor 38, serving as an output unit, in response to input of data received by USB-IR 22 as a data input unit and hard drive 28 as a storage unit.

Figure 2:
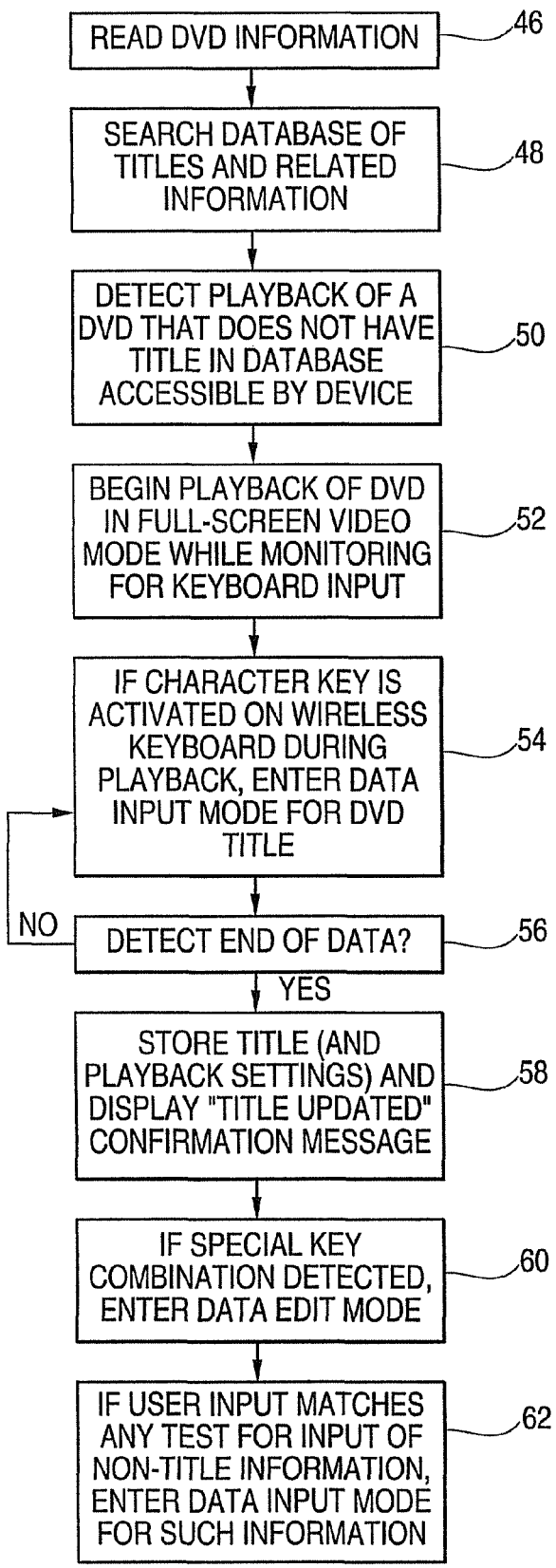
FIG. 2 is a flowchart of a method according to the present invention.

An example of the procedure performed by CPU 14 is illustrated in FIG. 2. In a conventional manner, a recording, such as a DVD movie, is selected and begins to be played in response to user inputs. In the preferred embodiment, a disc identification process is used to obtain titles of DVDs without requiring user input. Information on the DVD is read 46 and at least one database is searched 48 for title information. The database containing titles and other information may be pre-stored in the playback device, or accessible from a local or remote device connected to the playback device, via a local serial connection or the Internet. The disc identifier used may be any information stored on or associated with the disc.

When CPU 14 detects 50 playback of a DVD that does not have a title stored in a database accessible by the playback device, playback of the DVD begins 52 in conventional full-screen video mode while CPU 14 monitors for keyboard input. If activation of any character key is detected 54 during playback of the DVD contents, i.e., anytime during playback of video or menus from the DVD, CPU 14 enters a data input mode for the title of the DVD using the on-screen display capability provided by video processor 38. The character that activates the data input mode is captured as the first character in the title of the DVD.

When CPU 14 detects 56 the end of data input, e.g., by the user depressing the "Enter" key, the title that has been entered and displayed using the on-screen display is stored 58 in the database. Preferably, playback settings, such as language, surround sound mode, and any other user-selectable settings set using CPU 14 are stored in the database, so that these settings can automatically be used the next time the DVD is played. A confirmation message indicating "title updated" is displayed using the on-screen display for a short period of time and then the on-screen display disappears in a manner similar to the display of "PLAY" by conventional video cassette recorders. The information in the database can be used not only for display on the video screen via video out 42, but also on any other display that can receive information from CPU 14, such as a liquid crystal display (not shown) on the housing of the DVD changer.

In the preferred embodiment, the on-screen display capabilities of video processor 38 are also used to edit data stored in the database, even while contents of the DVD are being displayed. Preferably, a special key combination, such as Ctrl-Alt-Shift-M, is used to enter a data edit mode. When CPU 14 detects 60 the special key combination, the on-screen display is activated to display contents of the database record for the DVD. The title can be changed and any other information, such as style or rating may be changed. In the preferred embodiment, playback settings are automatically updated in the database record if there is a change. Optionally, a confirmation to change the settings may be displayed using the on-screen display, and a password may be requested to alter the contents of the database.

In addition to the special key combination to access all contents of the database, CPU 14 preferably monitors 62 for keywords, such as STYLE and RATING. Assuming the title has already been entered, the characters are not displayed until a complete keyword is detected. In response to detecting a keyword, CPU 14 causes video processor 38 to display a prompt, such as "ready for style name" or "ready for rating". Subsequent characters are displayed as they are entered and are stored upon receiving an end of data indication in response to which the database is updated as described above for the title.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of inputting text associated with a recording, comprising:
    playing the recording on a video screen;
    during playback of the recording, detecting a first text character entered by a keyboard;
    in response to detection of the first text character, determining whether a title of the recording is previously stored, and then only if the title of the recording is not previously stored, entering a text input mode, wherein in text input mode playback of the recording is continued on at least a portion of the video screen, and wherein the first text character is displayed on the video screen;
    if text input mode is entered, then during the text input mode, receiving subsequent text characters entered by the keyboard and displaying the subsequent text characters on the video screen; and if text input mode is entered, then storing the first text character and subsequent text characters as text associated with the recording.

2. A method as recited in claim 1, wherein the first text character and subsequent text characters are stored as the title of the recording.

3. A method as recited in claim 1, wherein the recording is a digital versatile disc.

4. A method as recited in claim 1, wherein entering a text input mode includes generating a text display by a digital versatile disc player using on-screen display capability.

5. A method as recited in claim 4, wherein the storing uses a database accessible by the digital versatile disc player, the database including at least identifiers and titles for digital versatile discs, and wherein the method further comprises determining, in response to detection of the first text character, whether the digital versatile disc currently being played has a corresponding identifier in the database.

6. A system comprising: a video player operative to play a recording by outputting a video signal stored on the recording, the video player further being operative to generate an on-screen text display; a keyboard; a storage unit that associates recording identifiers with text data; and a control unit coupled to the video player, the keyboard, and the storage unit, the control unit being operative, during playing of the recording, to detect a first text character entered by a keyboard, to enter a text input mode in response to detection of the first text character, to receive subsequent text characters, and to cause the storage unit to store the first text character and subsequent text characters entered by the keyboard during the text input mode as text associated with the recording, wherein the control unit further being operative, in response to detection of the first text character, to determine whether, in the storage unit, text data is associated with a recording identifier that corresponds to the recording being played, the control unit being operative to enter the text input mode only upon a determination that no text data is associated with the recording identifier.

7. A system as recited in claim 6, wherein the control unit is operative to communicate the first text character and subsequent text characters entered by the keyboard during the text input mode control unit to the video player, and wherein the video player is operative to display the first text character and subsequent text characters in the on-screen text display while continuing to play the recording.

8. A system as recited in claim 6, further comprising a video screen coupled to the video player to receive the video signal, wherein the video player is operative to overlay the video output with the on-screen text display in the text input mode.

9. A system as recited in claim 6, wherein the text associated with the recording is the title of the recording.

10. A system as recited in claim 6, wherein the recording is a digital versatile disc, wherein the storage unit includes a database, and wherein the database associates titles of digital versatile discs with identifiers of digital versatile discs.

11. At least one program embodied on a non-transitory computer readable medium, the program controlling a programmable device to perform a method comprising:

playing a recording on a video screen;

during playback of the recording, detecting a first text character entered by a keyboard;

in response to detection of the first text character, determining whether a title of the recording is previously stored, and then only if the title of the recording is not previously stored, entering a text input mode, wherein in text input mode playback of the recording is continued on at least a portion of the video screen, and wherein the first text character is displayed on the video screen;

if text input mode is entered, then during the text input mode, receiving subsequent text characters entered by the keyboard and displaying the subsequent text characters on the video screen; and if text input mode is entered, then storing the first text character and subsequent text characters as text associated with the recording.

* * * * *